United States Patent Office 2,972,606
Patented Feb. 21, 1961

2,972,606

CATALYTIC AMINOETHYLATION OF CELLULOSE, CELLULOSE DERIVATIVES OR POLYVINYL ALCOHOL

Robert J. Hartman, Wyandotte, and Edward J. Fujiwara, Gibralter, Mich., assignors to Wyandotte Chemicals Corporation, Wyandotte, Mich., a corporation of Michigan No Drawing. Filed May 31, 1956, Ser. No. 588,236

8 Claims. (Cl. 260—91.3)

This invention relates to the catalytic aminoethylation of cellulose, cellulose derivatives or polyvinyl alcohol. In a more specific aspect, this invention relates to a new catalytic method for reacting a cellulosic material or polyvinyl alcohol with an ethylenimine so as to produce aminoethylated products containing high amounts of nitrogen in a single pass reaction.

The processes of the prior art for aminoethylating cellulose have provided aminoethylated products which either had only a low amount of nitrogen, or required high temperatures as well as reaminoethylation, that is, the subjection of an aminoethylcellulose to repeated reactions with ethylenimine, in order to provide high-nitrogen aminoethylation products. Thus, U.S. 2,097,120, Fink et al., discloses that nitrogenous compounds of cellulose are obtained by reacting cellulose with ethylenimine at 100° C., and they obtained products having up to about 2.5% of nitrogen. Further investigation of the amination of cellulose with ethylenimine is reported by Louis M. Soffer and Eloise Carpenter, Textile Research Journal, XXIV, 847 (1954) wherein aminated cottons having nitrogen contents ranging up to 29% were prepared by heating chemical cotton with ethylenimine at 140–180° C. However, Soffer et al. obtained an amino nitrogen content of only from 19–20% in a single pass reaction of cellulose with ethylenimine maintained at 167° C. for 18 hours. High-nitrogen content aminoethylated products (up to 29% nitrogen) were only obtained by Soffer et al. by three successive reaminoethylation reactions of the cellulose starting material.

It is apparent that the methods disclosed heretofore for aminoethylating cellulose to obtain products containing 26% nitrogen, or more, have serious disadvantages such as the requirement for recycling operations, high temperatures, high pressures and the use of specialized equipment related to such conditions. Such aminoethylated cellulose or aminoethylated polyvinyl alcohol having high amounts of nitrogen are particularly desirable as reactants for perchloration to polyperchlorate salts, or to form nitrate salts or nitramine compounds, all of which are valuable ingredients in propellant compositions. The aminoethylated cellulose or polyvinyl alcohol products of the process of this invention are also useful as ion exchange resins and for enhancing desirable properties of textiles, paper, and the like, such as by improving dyeing properties and increasing wet strength.

It is an object of this invention, therefore, to provide an improved process for reacting cellulose or polyvinyl alcohol with ethylenimine, or homologues thereof.

It is a further object of this invention to provide a catalytic process for the polyaminoethylation of cellulose or polyvinyl alcohol wherein the reaction time is reduced, the yield of aminoethylated product is increased, and the reaction is simplified.

A still further object of this invention is to provide a process for producing aminoethylcellulose or aminoethyl-polyvinyl alcohol in a single pass reaction wherein the product contains over 20% nitrogen.

Essentially the problem which has been overcome by the present invention, the reaction of cellulose or derivatives thereof or polyvinyl alcohol with ethylenimine or homologues thereof, concerns the minimization of the polymerization of ethylenimine itself while obtaining a controlled graft polymerization of ethylenimine onto cellulose or polyvinyl alcohol. The structure of aminoethylcellulose has not been definitely determined, but it is believed that ethylenimine is graft polymerized onto cellulose with the hydroxyl groups acting as points for the initial graft as shown below:

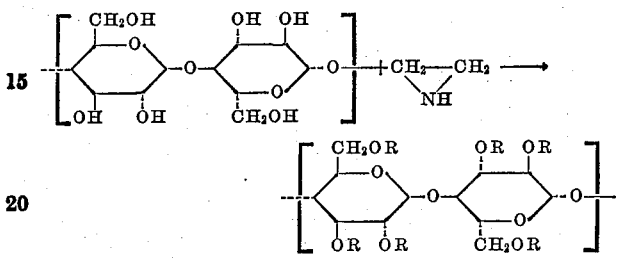

wherein R is $(CH_2CH_2NH)_nCH_2CH_2NH_2$ and $n$ is an integer having values generally between 4 and 8. We have discovered a new catalytic process for the reaction of cellulose or polyvinyl alcohol with ethylenimine, or homologues thereof. Although some of the catalytic substances in our process are also catalysts for the polymerization of ethylenimine itself, other compounds which are known to be catalysts for the polymerization of ethylenimine itself, do not promote the graft polymerization of ethylenimine onto cellulose or polyvinyl alcohol, which is the primary objective of this invention. The catalytic process which we have discovered permits the production of aminoethylcellulose or aminoethyl-polyvinyl alcohol with high nitrogen content, for example, up to about 26–30% nitrogen, at temperatures in the range from about room temperature to about 140° C. at atmospheric pressure or under superatmospheric pressures. The need for recycling operations in order to obtain aminoethylated products having high nitrogen content has been eliminated.

Generally stated, our new process comprises heating a cellulose or polyvinyl alcohol with ethylenimine in the presence of a solvent or diluent and a catalyst.

In general, most of the catalysts which we have found to be effective to promote the aminoethylation of cellulose or polyvinyl alcohol are halogen compounds having active halogen atoms. Organic halides having inactive halogen atoms, for example, chlorobenzene, have no catalytic effect on the aminoethylation process of this invention. One compound which is not a halogen compound containing an active halogen atom and which has been found to be an effective catalyst in our process is p-toluenesulfonic acid. The halogen compounds having active halogen atoms which are effective in promoting the aminoethylation process of this invention include chlorides, bromides, iodides and fluorides, and the organic chlorides containing active chlorine atoms are especially effective inasmuch as their use results in aminoethylated products having consistently high nitrogen content with short reaction time. Organic chlorides are also desirable because they are easy to handle and are readily available.

The method of this invention is one for reacting cellulose or derivatives thereof or polyvinyl alcohol with ethylenimine or a homologue thereof by heating the ethylenimine reactant and cellulose or polyvinyl alcohol in the presence of a solvent or diluent and a catalytic amount of a catalyst disclosed herein as set forth in detail as follows.

The organic halides containing active halogen atoms which have been found to be effective as catalysts in the aminoethylation process of this invention, in general, include alkyl halides, alkenyl halides, cycloalkyl halides, aralkyl halides, alkylammonium halides, halogenated aliphatic alcohols, and mineral acid salts of alkyl-, alkylaryl-, and arylamines. Also ammonium chloride, ammonium fluoride, mineral acids, alkylarylsulfonic acids and arylsulfonic acids, such as p-toluenesulfonic acid, and naphthalenesulfonic acid, have been found to be effective as catalysts for the aminoethylation process of the invention.

Examples of alkyl halides which have been found to be effective catalysts for the aminoethylation reaction of this invention are chloroform, carbon tetrachloride, methyl chloroform, ethyl dichloride, n-butyl bromide, sec-butyl bromide, tert-butyl bromide, isobutyl chloride, tert-butyl chloride, sec-butyl chloride, and n-octyl chloride. Alkenyl halides which have been found to be effective catalysts are trichloroethylene, tetrachloroethylene, allyl chloride, and allyl bromide. An example of cycloalkyl halides which has been found to be an effective catalyst is cyclohexyl chloride. An example of aralkyl halides which has been found to be an effective catalyst is benzyl chloride. Examples of alkylammonium halides which have been found to be effective catalysts are tetramethylamine chloride and tetraethylamine bromide. An example of a halogenated aliphatic alcohol which has been found to be an effective catalyst is ethylene chlorohydrin. Examples of mineral salts of alkyl-, alkylaryl- and arylamines which can be used are trimethylamine hydrochloride, dimethylaniline hydrochloride and aniline hydrochloride. Examples of mineral acids which are effective catalysts are hydrochloric acid and sulfuric acid.

As was previously stated, the organic chlorides having active chlorine atoms are preferred as the catalysts for use in accordance with this invention. Of the organic chlorides, ethylene dichloride, ethylene chlorohydrin, and allylic type chlorides, such as benzyl chloride and allyl chloride, are the most effective in promoting the reaction and, when used in our process, aminoethylated products having about 28% nitrogen are obtained with the reaction time of about 24 hours. Ammonium fluoride and hydrochloric acid are further examples of catalysts in this preferred group. The aliphatic chlorides are only slightly less preferred, for example, isobutyl chloride, sec-butyl chloride, octyl chloride and t-butyl chloride, inasmuch as aminoethylated products having about 27% nitrogen were obtained with these catalysts with a reaction time of two to three days. Trimethylamine hydrochloride is a further example of a catalyst in this intermediate class.

A further catalyst system which was found to be effective in promoting the aminoethylation process of this invention is the combination of calcium chloride in a saturated atmosphere of ethylene oxide. It has been found that, whereas untreated cellulose was relatively unreactive to ethylenimine at 100–140° C. in the absence of a catalyst, cellulose which was exposed to calcium chloride saturated with ethylene oxide vapor became very reactive to ethylenimine and aminoethylcellulose containing from 26–29% nitrogen was obtained at temperatures from 80–140° C. when the cellulose was so treated.

The cellulose which can be used in the process of this invention can be in a wide variety of chemical and physical forms. Generally speaking, alpha cellulose was employed in most of our work, but alpha celluloses having widely varying viscosities were employed and were found to react effectively to form aminoethylated products. Regenerated cellulose was found to react successfully and a short fiber alpha cellulose, sold commercially as "Solka-Floc BW 200," Brown Company, reacted satisfactorily in the process of the invention. Furthermore, cellulose fabrics can be used, such as mercerized thread, bleached cloth, unbleached muslin, medical gauze, and the like. Derivatives of cellulose have also been successfully employed in the process of the invention, such as methylcellulose, hydroxyethylcellulose and sodium carboxymethylcellulose.

Two types of polyvinyl alcohol, which are exemplary of all types of polyvinyl alcohol, have been found to react satisfactorily with the ethylenimine in the presence of catalyst of this invention, high viscosity polyvinyl alcohol, sold commercially as "Elvanol 72–60" and low viscosity polyvinyl alcohol, sold commercially as "Elvanol 70–05," E. I. du Pont de Nemours & Company.

Ethylenimine is the preferred aminoethylating reactant used in the process of the invention. However, substituted ethylenimines can be used such as lower alkyl-substituted ethylenimines e.g., 2-methylethylenimine, 2,2-dimethylethylenimine, trimethylenimine, and, in general, the homologues of ethylenimine, can be used. The substituted ethylenimines which can be used can have any number of carbon atoms up to the point where steric factors tend to reduce the reactivity of the ethylenimine with the hydroxyl groups of cellulose or polyvinyl alcohol. In general, ethylenimines having up to 14 carbon atoms are best for the reaction of the invention. Aryl-substituted ethylenimines can also be used, such as 2-phenylethylenimine, as well as substituted aryl-substituted alkylenimines, wherein the substituent on the aryl radical is a lower alkyl, aryl, amino, nitro or esterified carboxyl radical. Examples of the latter are 2-(p-tolyl)ethylenimine, 2-biphenylethylenimine, 2-(p-aminophenyl)-ethylenimine, 2-(2,4-dinitrophenyl)ethylenimine, and the methyl ester of p-(carboxyphenyl)ethylenimine.

The reaction of this invention of cellulose or polyvinyl alcohol with ethylenimine, or a homologue thereof, in the presence of a catalyst requires a solvent or diluent. Thus, we have found that aminoethylcellulose, when produced by reaction of cellulose with ethylenimine in the presence of ethylene chlorohydrin for 15 hours at 100° C. in the absence of any solvent or diluent, contained less than 20% nitrogen. However, the use of a solvent or diluent has been found to permit the production of aminoethylated cellulose or polyvinyl alcohol containing about 26% nitrogen, or higher, in a single pass reaction. In general, aliphatic and aromatic hydrocarbons which are nonpolar and nonreactive can be used as solvents effectively in the process of the invention, while polar and reactive solvents inhibit the reaction. Thus, such aliphatic and aromatic hydrocarbons as toluene, benzene, n-heptane, can be used as solvents. Also, dioctylphthalate, monochlorobenzene and o-dichlorobenzene are examples of solvents which can be used. It is desirable that the solvent have a boiling point under standard conditions which is above the boiling point of ethylenimine. Alkanes such as octane, nonane, decane, and the like, are generally satisfactory solvents, and solid hydrocarbons which are soluble in ethylenimine can also be used. Polar or reactive solvents were found to inhibit the process of the invention, such as water, methanol, ethanol, dimethylformamide, pyridine and isoamyl alcohol.

The temperature at which the reaction of this invention is carried out is in the range of about 80–140° C. At temperatures above 140° C., such as up to about 160° C., there is much polymerization of ethylenimine itself as well as partial decomposition of cellulose. At temperatures below about 80° C., the reaction requires about twice the time in order to produce an aminoethylated product having the same nitrogen content as that obtained in the temperature range of 100–140° C. The temperature range of about 90–130° C., is therefore the preferred temperature range since aminoethylated products having the highest content of nitrogen are obtained at the shortest reaction time in this temperature range.

The time which is required for carrying out the reaction of cellulose or polyvinyl alcohol with ethylenimine varies depending on the catalyst and amount of catalyst used, and the temperature employed. Complete reaction with ethylenimine was often obtained at 100° C. to 140°

C. when the reaction is carried out for 24 hours. However, a longer heating period such as 2 to 3 days, is required in some cases and particularly when the reaction temperature employed is less than 100° C. On the other hand, we have made several runs wherein the aminoethylation reaction was complete in 15 hours or less.

Actually, the effectiveness of the catalysts in the process of this invention in promoting the reaction of ethylenimine with cellulose was dramatically shown by the successful aminoethylation of cellulose treated with the calcium chloride-ethylene oxide catalyst system at room temperature. It was found that cellulose, so treated, reacted with ethylenimine at room temperature over a period of nine months to provide an aminoethylated product having over 15% nitrogen.

Pressure does not have any appreciable effect on the rate of reaction of cellulose or polyvinyl alcohol with ethylenimine. The process has been carried out in sealed tubes and also in sealed bomb reactors where the pressure on the system was that autogeneously developed by the reactants at the temperature employed. The reaction has also been carried out at atmospheric pressure in glass equipment by using an adequate condensing system to maintain the ethylenimine reactant in lqiuid phase throughout the reaction with cellulose or polyvinyl alcohol.

The amount of ethylenimine reactant employed in the process of our invention can be varied over a wide range. Although there is no absolute upper limit, since high nitrogen content aminoethylated cellulose or polyvinyl alcohol is produced when a large excess of ethylenimine is used, we have found that there is an amount of ethylenimine above which it is uneconomical to operate since the excess ethylenimine mostly is homopolymerized rather than graft polymerized. This effect of excess ethylenimine in producing only a relatively small increase in nitrogen in the aminoethylated product is shown in Example VI, Table 7, runs 1 to 6. Thus, the practical range for the amount of ethylenimine is from about 0.05 mol to about 0.60 mol ethylenimine per 0.0062 mol of anhydroglucose group in cellulose or per 0.023 mol of vinyl alcohol group in polyvinyl alcohol. The lower limit on the amount of ethylenimine is the only important limit since this amount in our catalytic process establishes one of the boundaries between the effectiveness of our process and the effectiveness of the prior art methods. With less than about 0.05 mol ethylenimine per 0.0062 mol of said anhydroglucose group or 0.023 mol of said vinyl alcohol group, the resulting aminoethylated product has less than 20% nitrogen as was obtained in the prior art methods. Although our process is a new process and should not necessarily be required to produce higher nitrogen content products to be patentable, the most important advantage of our process is the improvement in amount of nitrogen obtained in the aminoethylated product of our process and when 0.05 mol of ethylenimine, or more, per 0.0062 mol of said anhydroglucose group or 0.023 mol of said vinyl alcohol group is used in our process, aminoethylated products having over 20% nitrogen are obtained. The best yields of high nitrogen content aminoethylated products, i.e., from 26–30% nitrogen, are obtained when the amount of alkylenimine is from about 0.14 to 0.30 mol of ethylenimine per 0.0062 mol of said anhydroglucose group or 0.023 mol of said vinyl alcohol group.

The amount of solvent or diluent used in our process can also be varied over a wide range. As in the case of the amount of ethylenimine used, the lower limit is the only important limitation, since any large excess of solvent can be used and the high nitrogen content aminoethylated products which are desired will be obtained. However, the use of a large excess of solvent has the effect of diluting the reactants so that a longer reaction time is required to get nitrogen content equal to that obtained at a shorter reaction time when a smaller amount of solvent is used. About 0.2 gram of solvent per gram of ethylenimine is the amount of solvent required so that aminoethylated products having over 20% nitrogen are obtained. The practical range for the amount of solvent is, therefore, from about 0.2 to 5.0 grams per gram of ethylenimine and aminoethylated cellulose and polyvinyl alcohol having from 26–30% nitrogen are obtained by the process of our invention when the amount of solvent is from about 0.5 to 5.0 grams per gram of ethylenimine. We obtained our best results consistently when an equal weight of solvent and ethylenimine was used.

The amount of catalyst employed in the process varies widely, depending on the specific catalyst involved as well as on the temperature at which the process is carried out. The amount of catalyst is, actually, a catalytic amount, i.e., that amount which provides higher nitrogen content in the product than has previously been produced in a single pass reaction, and is that amount desirably which produces aminoethylated products having over 20% nitrogen, preferably over 26% nitrogen. We were able to consistently obtain aminoethylated products by our process having 26–30% nitrogen when the reaction was run at 100° C. using 0.94 millimols of several different catalysts per 0.0062 mol of anhydroglucose group in the cellulose or 0.023 mol of vinyl alcohol group in the polyvinyl alcohol. On the other hand, we obtained aminoethylated cellulose having 30% nitrogen when only 0.35 millimol of benzyl chloride per 0.0062 mol of anhydroglucose group was used as the catalyst, although the reaction time had to be increased to 72 hours. Larger amounts of catalyst than are necessary to obtain 26–30% nitrogen in the aminoethylated product of our process are to be avoided since the result is to tend to homopolymerize the ethylenimine rather than graft polymerize the ethylenimine onto cellulose or polyvinyl alcohol. For example, we obtained aminoethylated cellulose having 26% nitrogen when 1 millimol of trimethylamine hydrochloride per 0.0062 mol of anhydroglucose group was used, and under the same conditions, obtained 20% nitrogen in the aminoethylated cellulose when 2 millimols of trimethylamine hydrochloride per 0.0062 mol of anhydroglucose group was used. On the other hand, we obtained aminoethylated cellulose having about 28% nitrogen under the same conditions as the trimethylamine hydrochloride runs just mentioned, i.e., 100° C. using 1 gram of cellulose, 10 milliliters of toluene and 10 milliliters of ethylenimine, when 7.4 millimols of ethylene chlorohydrin per 0.0062 mol of anhydroglucose group were used. Generally speaking, therefore, the amount of catalyst employed in our process can vary from about 0.2 to 10.0 millimols per 0.0062 mol of anhydroglucose group in cellulose or per 0.023 mol of vinyl alcohol group in polyvinyl alcohol, and we have found that the best range of amount of catalyst is from about 0.75 to 1.0 millimol per 0.0062 mol of said anhydroglucose group or per 0.023 mol of said vinyl alcohol group.

The following examples are supplied to illustrate the process of our invention and should not be employed to unduly restrict the scope of the invention as it is set forth herein.

EXAMPLE I

A series of runs was made at varying temperatures wherein the catalyst system was calcium chloride in a saturated atmosphere of ethylene oxide.

The calcium chloride-ethylene oxide catalyst system was prepared by placing one pound of calcium chloride and a beaker containing 50 milliliters of ethylene oxide in a closed desiccator and permitting the ethylene oxide to evaporate.

The cellulose employed was chemical cotton chopped in a standard Wiley cutting mill equipped with a screen with 0.5 mm. diameter holes. The cellulose was prepared for use by allowing it to stand in distilled water for several days, following which the aqueous slurry was filtered by suction, the wet filter cake slurried with ethanol and filtered again. The resulting filter cake was then broken up and air dried for 8 hours.

The calcium chloride-ethylene oxide catalyst system was used to promote the reaction of the thus prepared cellulose with ethylenimine by drying the cellulose in the desiccator over the calcium chloride in the ethylene oxide atmosphere for 2 days.

One gram (1.0 g.) of the thus treated cellulose was then transferred to a Pyrex combustion tube which was 300 mm. in length, 19 mm. in internal diameter and which had a 3 mm. wall thickness. The tube was constricted to a diameter of 1–2 mm. at approximately 1 inch from its open end and 8.3 grams of ethylenimine (10 ml.) and 10 ml. of toluene were added to the tube. The tube was then sealed at the point of constriction.

The tube and its contents were then heated to the temperature and for the time indicated below in Table 1. During the course of the reaction, the cellulose swelled until the entire volume of the reaction mixture appeared to be a white solid.

Wherever the percent nitrogen is given in any of the examples in this application, the nitrogen test was done by the Kjeldahl method unless otherwise noted. The percent nitrogen in the product of some of the runs in this application was calculated from the weight of the aminoethylated product obtained. We have found this to be a valid measurement of the percent nitrogen in our products since the material balance has been found to coincide very closely, i.e., within about 0.5%, with the percent nitrogen found by the Kjeldahl method.

The treatment of the products of this example and of all the other examples was the same. In every case, the aminoethylated product was slurried in methanol and filtered until the methanol filtrate was neutral. When the product was analyzed by the Kjeldahl method, the product was then treated with a 1% aqueous sodium hydroxide solution to remove any carbonates present. When the product analysis was based on the weight of the product obtained, the methanol-washed product was filtered, dried over phosphorus pentoxide in vacuo and weighed.

The results of these runs are reported below in Table 1.

Table 1

CELLULOSE-ETHYLENIMINE REACTION—PROMOTED BY CALCIUM CHLORIDE-ETHYLENE OXIDE CATALYST SYSTEM

| Run No. | Reaction Temp., °C. | Reaction Time, hours | Percent Nitrogen in Product |
|---|---|---|---|
| 1 | 140 | 24 | 26.9 |
| 2 | 120 | 28 | 26.7 |
| 3 | 100 | 24 | 26.0 |
| 4 | 80 | 44 | 26.2 |

The products of the runs reported in Table 1 were analyzed by sections, also, and it was found that the cellulose exposed only to vapors in the tube contained less nitrogen than did the cellulose which was completely submerged in liquids. Therefore, while the reaction of this invention proceeds by contacting ethylenimine vapors with cellulose, it is preferred to employ ethylenimine in liquid phase when carrying out the process of the invention.

It is not positively known how the calcium chloride-ethylene oxide system functions to promote the reaction of cellulose with ethylenimine. However, for comparison purposes it should be noted that we have found that cellulose is unreactive at 100° C. to ethylenimine when the cellulose was treated in the following ways before reaction with ethylenimine was attempted:

(1) Cellulose washed with distilled water and dried over unreacted calcium chloride;
(2) Cellulose washed with distilled water and dried (a) in an oven at 60° C., (b) over phosphorous pentoxide in vacuo, or (c) over Drierite;
(3) Dry cellulose initially stored in a bottle with a few drops of ethylene oxide;
(4) Freshly chopped cellulose, with no further treatment;
(5) Cellulose allowed to stand in 5% hydrochloric acid for 3 days, washed with water, air dried, and finally dried over calcium chloride; or
(6) Cellulose allowed to stand in 35% potassium hydroxide solution for 2 hours, and resulting mixture poured into a beaker of cold water and allowed to stand overnight. Cellulose then washed with hot water until neutral and dried over phosphorus pentoxide in vacuo.

EXAMPLE II

The reaction of cellulose with ethylenimine in accordance with this invention can be carried out by using a combination of the catalysts which we have discovered for this reaction. Thus, a series of runs was carried out wherein cellulose was treated with the calcium chloride-ethylene oxide catalyst system, as described in Example I, and 1 gram of the thus "activated" cellulose was then reacted with 15 ml. of ethylenimine in the presence of varying amounts of ammonium chloride as an added catalyst. Toluene was employed as a solvent in these runs and the reactions were carried out at atmospheric pressure by refluxing and stirring the "activated" cellulose in the presence of the added catalyst and solvent under a condenser fitted with a soda-lime tube. Under the reflux conditions, the reaction was carried out at a considerably lower temperature than was the case in Example I, that is, at from 70–100° C. The aminoethylcellulose product obtained was washed with methanol and ether and dried in vacuo. The results of these runs are set forth below in Table 2.

A further series of runs was carried out at atmospheric pressure as described above, except that the added catalyst was a halogenated solvent, itself, and no additional solvent was used. In each of the runs 1 gram of the "activated" cellulose was reacted with 15 ml. of ethylenimine in the presence of 50 ml. of added halogenated sol- Table 2

CELLULOSE-ETHYLENIMINE REACTION AT ATMOSPHERIC PRESSURE AND REFLUX TEMPERATURE (70–100° C.)

| Run No. | Added Catalyst | Amount of Added Catalyst, g. | Amount of Toluene, ml. | Reaction Time, hrs. | Yield of Aminoethylcellulose, g. | Percent Nitrogen in Product |
|---|---|---|---|---|---|---|
| 1 | None | | 50 | 48 | 1.4 | [1] 9.3 |
| 2 | Ammonium chloride | 0.05 | 50 | 24 | 2.5 | [1] 19.5 |
| 3 | do | 0.08 | 50 | 48 | 6.7 | 26.5 |
| 4 | do | 0.08 | 50 | 72 | 8.3 | [1] 28.6 |
| 5 | do | 0.20 | 50 | 24 | 5.5 | 26.0 |

[1] Based on weight of aminoethylcellulose obtained.

vent-catalyst. The results of these runs are reported below in Table 3.

Table 3
CELLULOSE-ETHYLENIMINE REACTION AT ATMOSPHERIC PRESSURE AND REFLUX TEMPERATURE (70–100° C.) WITH HALOGENATED SOLVENT-CATALYST

| Run No. | Added Catalyst-Solvent | Reaction Time, hrs. | Yield of Aminoethylcellulose, g. | Percent Nitrogen in Product |
|---|---|---|---|---|
| 1 | Chloroform | 24 | 1.9 | [1] 15.4 |
| 2 | do | 48 | 3.5 | [1] 23.2 |
| 3 | do | 72 | 5.4 | [1] 26.5 |
| 4 | do | 96 | 4.9 | 22.9 |
| 5 | Methyl chloroform | 24 | 5.4 | 24.4 |
| 6 | Trichloroethylene | 48 | 7.4 | 26.6 |
| 7 | Tetrachloroethylene | 24 | 13.6 | 27.4 |
| 8 | Ethylene dichloride | 1 | 9.0 | 25.1 |

[1] Based on weight of aminoethylcellulose obtained.

Also, a run was made with the chemical cotton described in Example I, not subjected to "activation" with the calcium chloride-ethylene oxide catalyst system, using 1 gram of cellulose, 10 milliliters of ethylenimine, 0.1 gram ethylene dichloride as catalyst, 10 mililiters of o-dichlorobenzene as solvent, in a sealed tube, as described in Example I, at 100° C. for 48 hours, and the product contained over 26% nitrogen.

Although the use of chlorinated solvents as an added catalyst does further promote the reaction of ethylenimine with cellulose "activated" by treatment with the calcium chloride-ethylene oxide catalyst system, this use of chlorinated solvents has the disadvantage that the aminoethylcellulose thus produced has a considerable amount of the chlorinated solvent incorporated in the aminoethylcellulose product, since upon prolonged heating the halogenated solvent reacts with the amino radicals in the aminoethylcellulose. Thus, when the product of run 7, Table 3, was boiled for 3 hours in a 1% sodium hydroxide solution, there was a weight loss in the product of 25% due to the removal of the tetrachloroethylene by the base from the aminoethylcellulose.

EXAMPLE III

The disadvantage of incorporating the chlorinated solvent into the aminoethylcellulose which occurs when a chlorinated solvent is employed as a catalyst in the reaction of cellulose with ethylenimine is overcome by using a liquid hydrocarbon as a solvent and a halogenated compound as an added catalyst. The cellulose employed in the runs reported below in Table 4 was the chemical cotton chopped in the Wiley mill described in Example I, but had not been previously "activated" by subjection to the calcium chloride-ethylene oxide catalyst system as described in Example I.

In the runs reported in Table 4, 1.0 gram of the cellulose was reacted with 15 milliliters of ethylenimine in the presence of 50 milliliters of toluene as a solvent by refluxing and stirring at 70–100° C. in a round-bottom flask equipped with a condenser fitted with a soda-lime drying tube.

Table 4
CELLULOSE-ETHYLENIMINE REACTION AT ATMOSPHERIC PRESSURE WITH CATALYST AND HYDROCARBON SOLVENT

| Run No. | Catalyst | Amount of Catalyst | Reaction Time, hrs. | Yield of Aminoethylcellulose, g. | Percent Nitrogen in Product |
|---|---|---|---|---|---|
| 1 | Ethylene dichloride | 0.9 ml | 20 | 10.3 | 23.0 |
| 2 | Trimethylamine hydrochloride | 0.07 g | 64 | 6.0 | 27.3 |
| 3 | Benzyl chloride | 0.10 ml | 47 | | 27.8 |

The runs reported in Examples II and III demonstrate that cellulose reacts with ethylenimine at atmospheric pressure in the process of our invention employing a catalyst, and the resulting aminoethylcellulose has higher amounts of nitrogen than were obtained in a single pass reaction in any process in the prior art. These runs were carried out at considerably lower temperatures, 70–100° C., than are indicated as necessary by the prior art, also.

As a matter of fact, we have found that an appreciable amount of aminoethylation occurred when cellulose was treated with the calcium chloride-ethylene oxide catalyst system described in Example I and then stored at room temperature in a sealed tube with ethylenimine and toluene as a solvent. Mixtures of these materials, containing 1.0 gram of the "activated" cellulose, prepared as described in Example I, 10.0 milliliters of toluene and 15.0 milliliters of ethylenimine were stored in sealed tubes, and at the end of 9 months standing, with periodic shaking of the tubes, 2.22 grams of aminoethylcellulose was obtained which contained 15.5% nitrogen.

EXAMPLE IV

The runs reported in this example were made with compounds which we have found to be catalysts for the reaction of cellulose with ethylenimine. The cellulose employed was cotton obtained in sheet form which was chopped in the Wiley mill described in Example I. These runs were carried out in the sealed tubes described in Example I, and therefore, the pressure was that autogenously developed by the reactants at the temperature employed.

The runs reported below in Table 5 were carried out by placing 1.0 gram of cellulose, 10 milliliters of ethylenimine and 10 milliliters of toluene in the tubes, sealing the tubes and heating the tubes and contents to 100° C. for the time indicated.

In those runs where a nitrogen analysis was not carried out on the product but the observation is made that the reaction was complete, the reaction product contained over 26% nitrogen.

Table 5
CELLULOSE-ETHYLENIMINE REACTION WITH VARIOUS CATALYSTS IN SEALED TUBES

| Run No. | Catalyst | Amount of Catalyst | Reaction Time, hrs. | Percent Nitrogen in Product |
|---|---|---|---|---|
| 1 | n-Octyl chloride | 0.94 millimol | 48 | 27.9 |
| 2 | sec-Butyl chloride | do | 48 | 28.1 |
| 3 | tert-Butyl chloride | do | 48 | 27.5 |
| 4 | Benzyl chloride | do | 48 | 27.8 |
| 5 | Allyl chloride | do | 48 | 27.8 |
| 6 | Cyclohexyl chloride | do | 48 | 16.9 |
| 7 | p-Toluenesulfonic acid | do | 48 | 23.3 |
| 8 | n-Butyl bromide | do | 48 | 24.1 |
| 9 | sec-Butyl bromide | do | 48 | 25.1 |
| 10 | tert-Butyl bromide | do | 48 | 25.1 |
| 11 | Allyl bromide | do | 48 | 24.3 |
| 12 | Tetramethylamine chloride | do | 72 | 21.6 |
| 13 | Tetraethylamine bromide | do | 72 | 22.5 |
| 14 | Ethylene dichloride | 0.05 ml | 48 | 28.1 |
| 15 | do | 0.10 ml | 48 | 28.2 |
| 16 | Isobutyl chloride | 3 drops | [1] 30 | Complete Reaction. |
| 17 | do | 10 drops | 48 | Do. |
| 18 | Ethylene chlorohydrin | 3 drops | 48 | Do. |
| 19 | Trimethylamine hydrochloride | 0.05 g | 48 | Do. |
| 20 | do | 0.1 g | 48 | 26.1 |
| 21 | do [2] | 0.05 g | 48 | 26.5 |
| 22 | Hydrochloric acid (concentrated) | 0.94 millimol | 15 | 27.2 |
| 23 | Aluminum chloride hexahydrate | do | 15 | 27.6 |
| 24 | Methyl iodide | do | 48 | 20.1 |
| 25 | Ammonium fluoride | do | 15 | Complete Reaction. |

[1] Reaction temperature was 130° C.
[2] Short fiber length (35 microns) cellulose, Solka Floc BW 200, Brown Company, used instead of cotton.

In addition to the runs reported above, runs were made under the same or comparable conditions wherein the following compounds were employed as the catalyst and which were found to be ineffective since little or no reaction occurred; phenol, zinc chloride and benzoic acid. It may be noted that these last named materials are known to be catalysts for the homopolymerization of ethylenimine.

It was pointed out in the earlier discussion of the process of our invention that a solvent is necessary in our process in order that high nitrogen content aminoethylated products can be obtained. This was demonstrated in a run wherein 1 gram of the chemical cotton described in Example I, not subjected to "activation" by the calcium chloride-ethylene oxide catalyst system, was reacted at 100° C. with 10 milliliters of ethylenimine in the presence of 0.1 milliliter of ethylene chlorohydrin as a catalyst and without any solvent or diluent. At the end of 15 hours, no further reaction took place and the aminoethylcellulose product contained 18.2% nitrogen. This can be compared to run 18 in Table 5, above, wherein a comparable run with 10 milliliters of toluene as a solvent produced aminoethylcellulose containing over 26% nitrogen.

EXAMPLE V

A series of runs was carried out wherein cellulose "activated" by subjection to the calcium chloride-ethylene oxide catalyst system was reacted with ethylenimine in the presence of various solvents. These runs are reported below in Table 6 and were carried out by heating 1.0 gram of the "activated" cellulose, as described in Example I, in a sealed tube, also described in Example I, with 8.3 grams of ethylenimine (10 ml.) and 10 milliliters of the indicated solvent.

*Table 6*

CELLULOSE-ETHYLENIMINE REACTION—VARIOUS SOLVENTS

| Run No. | Solvent | Reaction Temp., °C. | Reaction Time, hrs. | Percent Nitrogen in Product |
|---|---|---|---|---|
| 1 | Dioctylphthalate | 140 | 39 | 25.4 |
| 2 | Toluene | 140 | 24 | 26.9 |
| 3 | Benzene | 100 | 48 | 27.8 |
| 4 | n-Heptane | 100 | 18 | 27.2 |

The results of these runs show that solvents having little or no polarity can be used, such as aliphatic and aromatic hydrocarbons. Dioctylphthalate was satisfactory as a solvent in the sense that the celulose-ethylenimine reaction proceeded satisfactorily; however, dioctylphthalate possesses the disadvantage of being capable of reacting with ethylenimine and is difficult to remove from the reaction mixture. Polar and reactive solvents cannot be used, and it was found that the cellulose-ethylenimine reaction did not proceed when such solvents as water, methanol, ethanol, dimethylformamide, pyridine and isoamyl alcohol were used.

EXAMPLE VI

A series of runs was carried out to determine the effect of varying the proportion of amount of ethylenimine to cellulose in the reaction system.

In runs 1 to 6, inclusive, reported below in Table 7, the cellulose was the cellulose described in Example I which had been "activated" by subjection to the calcium chloride-ethylene oxide catalyst system, as described in Example I, and the reactions were carried in the sealed tubes described in Example I. The reactions were effected by placing 1.0 gram of the "activated" cellulose in a tube with 10 milliliters of toluene as a solvent and with the indicated amount of ethylenimine and were carried out at 100° C. for 2–3 days.

In runs 7 to 10, inclusive, reported below in Table 7, varying amounts of untreated chemical cotton chopped in the Wiley mill described in Example I were reacted with the indicated amount of ethylenimine in the presence of 0.1 milliliter of benzyl chloride as a catalyst and the indicated amount of toluene as a solvent at 100° C. in a sealed tube for 45 hours.

*Table 7*

CELLULOSE-ETHYLENIMINE REACTION—EFFECT OF VARIED AMOUNT OF ETHYLENIMINE

| Run No. | Amount of Ethylenimine, ml. | Amount of Cellulose, grams | Amount of Toluene, ml. | Percent[1] Nitrogen in Product | Cellulose/Ethylenimine Ratio, g./ml. |
|---|---|---|---|---|---|
| 1 | 2.5 | 1.0 | 10 | 19.9 | 1/2.5 |
| 2 | 5 | 1.0 | 10 | 24.4 | 1/5 |
| 3 | 10 | 1.0 | 10 | 27.1 | 1/10 |
| 4 | 15 | 1.0 | 10 | 28.3 | 1/15 |
| 5 | 20 | 1.0 | 10 | 27.8 | 1/20 |
| 6 | 30 | 1.0 | 10 | 28.1[1] | 1/30 |
| 7 | 10 | 1.0 | 10 | 27.8 | 1/10 |
| 8 | 15 | 1.0 | 20 | 29.5 | 1/15 |
| 9 | 10 | 0.5 | 10 | 29.9 | 1/20 |
| 10 | 10 | 0.33 | 10 | 30.3 | 1/30 |

[1] Percent nitrogen based on weight of product.

Run 10 in Table 7 was repeated except that only 0.04 milliliter (0.35 millimol) of benzyl chloride was used as the catalyst, and, although the reaction time had to be increased to 72 hours, the aminoethylated celulose product contained 30% nitrogen.

These runs show one fact which is most important. We have been able to produce aminoethylcellulose in a single pass catalytic reaction of cellulose with ethylenimine with up to 30% nitrogen in the product. This was accomplished at a much lower temperature (100° C.) than used in the prior art procedures and without the requirement of successive and repeated reaction of the aminoethylcellulose with ethylenimine to get such a high nitrogen content as is indicated to be necessary by the disclosures previous to our invention.

EXAMPLE VII

A series of runs was carried out wherein cellulose, chemical cotton chopped in the Wiley mill described in Example I, was reacted with ethylenimine in a 250 milliliter stainless steel bomb reactor. The reactions were carried by heating 10.0 grams of the cellulose with 100 milliliters of ethylenimine and 100 milliliters of toluene at from 120–140° C. for the indicated time in the presence of the indicated amount of the stated catalysts in the process of this invention. These runs, 1 to 5, inclusive, are reported below in Table 8. Run 6 in Table 8 differed from runs 1 to 5 in that a short fiber alpha cellulose derived from wood, having a quite uniform average particle length of 35 microns, was used as the cellulose instead of the chopped cotton, the latter having little uniformity in particle length and averaging about 182 microns.

*Table 8*

CELLULOSE-ETHYLENIMINE REACTION IN BOMB REACTORS

| Run No. | Catalyst | Amount of Catalyst | Reaction Time, hrs. | Percent Nitrogen in Product |
|---|---|---|---|---|
| 1 | Trimethylamine hydrochloride | 0.5 g | 65 | 27.1 |
| 2 | do | 0.7 g | 65 | 27.0 |
| 3 | do | 0.5 g | 48 | 27.1 |
| 4 | Isobutyl chloride | 3 ml | 60 | 26.4 |
| 5 | Ethylenechlorohydrin | 0.6 ml | 65 | 27.4 |
| 6 | Trimethylamine hydrochloride | 0.5 g | 48 | 27.1 |

EXAMPLE VIII

A series of runs was made with alpha cellulose of varying viscosity (hence, varying degree of polymerization) in the reaction with ethylenimine in accordance with the invention. In these runs, the catalyst employed was the calcium chloride-ethylene oxide system, as described in Example I, whereby the cellulose samples were "activated" with the catalyst by storage in a desiccator with calcium chloride in an atmosphere saturated with ethylene oxide for 2 days.

The cellulose samples used are listed below by the grade indication by which they are commercially available from Southern Chemical Cotton Company together with the viscosity in seconds for each cellulose sample. The viscosity for each sample was determined by the cuprammonia viscosity procedure, which is the standard A.C.S. method.

TYPES OF CELLULOSE USED IN EXAMPLE VIII

| Sample No. | Viscosity (sec.) | Type |
| --- | --- | --- |
| 1 | 14 | Grade 10 (Sheet Form). |
| 2 | 35 | CSP-25 (Bulk). |
| 3 | 59 | CD unbleached (Bulk). |
| 4 | 75 | Grade 45 (Sheet Form). |
| 5 | 80 | Cl-50 (Bulk). |
| 6 | 220 | Grade 61 (Sheet Form). |
| 7 | 320 | Grade 23 (Sheet Form). |
| 8 | 520 | FC-400 (Bulk). |

Each of the cellulose samples was chopped in the Wiley mill equipped with a 0.5 mm. screen and "activated" with the calcium chloride-ethylene oxide catalyst for 2 days. Each sample was then sealed in a Pyrex tube with 10 milliliters of toluene and 10 milliliters of ethylenimine and heated at 100° C. for 48 hours. The products were washed free of base with methanol by slurrying and filtering, dried over phosphorus pentoxide in vacuo and weighed. The nitrogen content of the aminoethylcellulose products set forth below in Table 9 is based on the weight of aminoethylcellulose obtained.

Table 9

AMINOETHYLATION OF CELLULOSE OF VARYING VISCOSITY

| Sample No. | Viscosity (sec.) of cellulose | Weight of Product, g. | Percent Nitrogen |
| --- | --- | --- | --- |
| 1 | 14 | 6.385 | 27.4 |
| 2 | 35 | 4.980 | 26.0 |
| 3 | 59 | 3.420 | 23.1 |
| 4 | 75 | 4.875 | 25.8 |
| 5 | 80 | 5.950 | 27.1 |
| 6 | 220 | 6.585 | 27.6 |
| 7 | 320 | 7.120 | 27.9 |
| 8 | 520 | 3.680 | 23.5 |

The runs reported in Table 9 show that cellulose having widely varying viscosity, or degree of polymerization, can successfully be reacted in the process of this invention to form aminoethylcellulose.

Although we have obtained quite satisfactory results with our process when using the calcium chloride-ethylene oxide catalyst system by "activating" cellulose or polyvinyl alcohol for 2 days in this catalyst system, we have found that even better results in terms of nitrogen content in the aminoethylated product can be obtained when the time for "activating" cellulose or polyvinyl alcohol is longer than 2 days. The runs reported below in Table 10 were carried out with the same cellulose samples used in the runs reported in Table 9 and all the conditions were the same as in those runs, except that the cellulose samples were "activated" in the calcium chloride-ethylene oxide catalyst system, as described in Example I, but for 6 days instead of 2 days. It will be noted that the result of these runs in every case was to obtain aminoethylated cellulose containing 28.0% nitrogen or more.

Table 10

AMINOETHYLATION OF CELLULOSE OF VARYING VISCOSITY—CELLULOSE "ACTIVATED" 6 DAYS IN CALCIUM CHLORIDE-ETHYLENE OXIDE CATALYST SYSTEM

| Sample No. | Viscosity (sec.) of cellulose | Weight of Product, g. | Percent Nitrogen |
| --- | --- | --- | --- |
| 1 | 14 | 6.957 | 28.2 |
| 2 | 35 | 7.145 | 28.2 |
| 3 | 59 | 7.265 | 28.2 |
| 4 | 75 | 7.290 | 28.0 |
| 5 | 80 | 7.385 | 28.6 |
| 6 | 220 | 7.220 | 28.6 |
| 7 | 320 | 7.505 | 28.0 |
| 8 | 520 | 7.210 | 28.1 |

Cellulose in many different forms has been reacted with ethylenimine successfully in accordance with the invention. Also, derivatives of cellulose can be used, and runs in which these materials were reacted with ethylenimine are reported below in Table 11. These runs were made with 1.0 gram of the cellulose material or cellulose derivative, 10 milliliters of ethylenimine and 10 milliliters of toluene as a solvent.

Runs 1 to 4, inclusive, were made with the calcium chloride-ethylene oxide catalyst system by "activating" the cellulose material in the manner described in Example I.

Runs 5 to 7, inclusive, were made with 0.1 milliliter of ethylene chlorohydrin as a catalyst.

All the runs reported in Table 10 were carried out at 100° C.

Table 11

AMINOETHYLATION OF CELLULOSE MATERIALS AND CELLULOSE DERIVATIVES

| Run No. | Cellulose Material or Derivative | Reaction Time, hrs. | Percent Nitrogen in Product |
| --- | --- | --- | --- |
| 1 | Mercerized thread | 48 | 27.4. |
| 2 | Bleached cloth (twill and twill) | 48 | 25.4. |
| 3 | Unbleached muslin | 48 | 27.0. |
| 4 | Medical gauze | 48 | 27.9. |
| 5 | Methyl cellulose | 15 | Complete Reaction. |
| 6 | Hydroxyethylcellulose | 15 | 28.0. |
| 7 | Sodium carboxymethylcellulose | 15 | 24.7. |

Furthermore, aminoethylcellulose has been prepared by the process of this invention by using regenerated cellulose as the starting material.

In preparing the regenerated cellulose, a cuprammonium solution of cellulose was prepared by a standard procedure. After filtering the solution through glass wool, the filtrate was stirred rapidly while slowly adding concentrated hydrochloric acid to acidify the solution. The resulting precipitate was washed with water by centrifuging and decanting until the washings were neutral, and then the regenerated cellulose was dried at 80–110° C.

One gram of the regenerated cellulose was subjected to the calcium chloride-ethylene oxide catalyst, as described in Example I, for 2 weeks. The resulting "activated" regenerated cellulose was then heated with ethylenimine in the presence of toluene at 120° C. The aminoethylcellulose thus produced weighed 3.4 grams and contained 23.5% nitrogen.

EXAMPLE IX

As has been pointed out hereinbefore, the process of this invention is a new catalytic process for aminoethylating cellulose or polyvinyl alcohol. The catalyst systems disclosed in the preceding examples promote the reaction of ethylenimine with polyvinyl alcohol as well.

Two runs were made to react polyvinyl alcohol with ethylenimine in the sealed tubes, as described in Example I, using the calcium chloride-ethylene oxide catalyst system generally as described in Example I. The thus "activated" polyvinyl alcohol was prepared by soaking polyvinyl alcohol in 80% ethanol solution, filtering the solid, and drying the filtered solid in the desiccator containing calcium chloride saturated with ethylene oxide vapor for 5 days.

Two types of polyvinyl alcohol were used in our work. High viscosity polyvinyl alcohol, sold commercially as "Elvanol 72–60" is identified by the producer, E. I. du Pont de Nemours & Company, in their bulletin "Elvanol Polyvinyl Alcohol," third printing, from their Electrochemicals Department, Vinyl Products Division, as having a viscosity of 55–65 centipoises, based on a 4% water solution at 20° C. by the Hoeppler falling ball method, a percent hydrolysis of 99–100, a pH of 6–8, a maximum percent volatiles of 5, and a maximum percent ash of 1.0% wherein the ash is assumed to be sodium carbonate calculated as $Na_2O$.

The other type of polyvinyl alcohol used was a low viscosity polyvinyl alcohol sold commercially by Du Pont as "Elvanol 70–05" and which is identified in the same bulletin as having a viscosity of 4–6 centipoises, a percent hydrolysis of 98.5–100, a pH of 6–8, a maximum percent volatiles of 5, and a maximum percent ash of 2.0.

In the first run, 1.0 gram of "Elvanol 72–60" polyvinyl alcohol, "activated" as described above with the calcium chloride-ethylene oxide catalyst system, was reacted with 10 milliliters of ethylenimine in the presence of 10 milliliters of toluene in a sealed tube. The reactants were heated at 100° C. for 48 hours and the aminoethylated polyvinyl alcohol product weighed 7 grams and contained 27.4% nitrogen.

In the second run, 1.0 gram of "Elvanol 70–05" polyvinyl alcohol, "activated" with the calcium chloride-ethylene oxide catalyst, was reacted with 10 milliliters of ethylenimine in the presence of 10 milliliters of toluene in a sealed tube. The reactants were heated at 100° C. for 48 hours and the aminoethylated polyvinyl alcohol product contained over 26% nitrogen.

EXAMPLE X

A series of runs was made wherein the polyvinyl alcohol described in Example IX was reacted with ethylenimine in the presence of various catalysts previously used in reacting cellulose with ethylenimine. In each run, 1.0 gram of the polyvinyl alcohol was reacted with 10 milliliters of ethylenimine in the presence of 10 milliliters of toluene in a sealed tube by heating the reactants at 100° C. for 48 hours unless otherwise stated. The results of these runs are set forth below in Table 12.

The types of polyvinyl alcohol used were those described in Example IX, except Run No. 2 in which "Elvanol 51–05" polyvinyl alcohol was used, which is identified in the Du Pont bulletin mentioned above as being a low viscosity polyvinyl alcohol, having a percent hydrolysis of 87.7–89, a pH of 6–8, a maximum percent volatiles of 5, and a maximum percent ash of 1.5.

Table 12

POLYVINYL ALCOHOL-ETHYLENIMINE REACTION WITH VARIOUS CATALYSTS

| Run No. | Polyvinyl Alcohol | Catalyst | Amount of Catalyst | Percent Nitrogen in Product | Special Conditions |
|---|---|---|---|---|---|
| 1 | Elvanol 70–05 | Isobutyl chloride | 0.1 ml | 15–20 | Heated 20 hours at 60° C., then 48 hours at 100° C. |
| 2 | do | do | 0.1 ml | 15–20 | Only 5 ml. toluene used. |
| 3 | do | do | 0.1 ml | 15–20 | Benzene used as solvent. |
| 4 | do | do | 0.1 ml | 15–20 | Heptane used as solvent. |
| 5 | do | do | 0.1 ml | 26.2 | o-Dichlorobenzene used as solvent. |
| 6 | do | do | 6 drops | 26+ | |
| 7 | Elvanol 51–05 | do | 10 drops | 26+ | |
| 8 | Elvanol 70–05 | Trimethylamine Hydrochloride | 0.1 g | 15–20 | |
| 9 | do | do | 0.1 g | 15–20 | Heated 20 hours at 60° C., then 48 hours at 100° C. |
| 10 | Elvanol 72–60 | do | 0.1 g | 15–20 | |
| 11 | Elvanol 70–05 | sec-Butyl chloride | 0.1 ml | 15–20 | |
| 12 | do | do | 0.1 ml | 15–20 | 20 ml. toluene used. |
| 13 | do | do | 0.1 ml | 15–20 | Heated 16 hours at 100° C., cooled, then heated and shaken 24 hours at 100° C. |
| 14 | do | do | 0.1 ml | 27.4 | Do. |
| 15 | do | do | 0.1 ml | 27.7 | 10 g. of glass beads added to reaction mixture. |
| 16 | do | Ethylene chlorohydrin | 0.1 ml | 25.5 | |
| 17 | do | do | 0.1 ml | 15–20 | Reaction mixture periodically shaken 24 hours before heating. |
| 18 | do | do | 0.1 ml | 15–20 | Heated 20 hours at 60° C., then 48 hours at 100° C. |
| 19 | Elvanol 72–60 | do | 0.1 ml | 27.2 | |
| 20 | Elvanol 70–05 | Ethylene dichloride | 0.1 ml | 27.1 | |
| 21 | Elvanol 72–60 | do | 0.1 ml | 27.3 | |
| 22 | Elvanol 70–05 | Benzyl chloride | 0.1 ml | 15–20 | |
| 23 | do | Allyl chloride | 0.1 ml | 15–20 | |

The data set forth in Table 12 show that, while polyvinyl alcohol reacts with ethylenimine in the process of this invention to form an aminoethylated polyvinyl alcohol, the degree of aminoethylation is not consistently as high as when cellulose is reacted in the process of this invention. However, we believe we are the first to discover a catalytic process for reacting either cellulose or polyvinyl alcohol with ethylenimine, and certain of the runs in Table 12 produced aminoethylated polyvinyl alcohol having over 26% nitrogen in the single pass process. Thus, the results of runs Nos. 5, 6, 7, 14, 15, 16, 19, 20 and 21 show that isobutyl chloride, sec-butyl chloride, ethylene chlorohydrin, and ethylene dichloride were the best catalysts for the aminoethylation of polyvinyl alcohol.

Run No. 14 shows that the aminoethylation of polyvinyl alcohol is more complete when the reactants are agitated during the reaction.

EXAMPLE XI

Larger scale runs were made for aminoethylating polyvinyl alcohol following the specific process of run No. 14, Table 12, above, wherein the reactants were agitated during the reaction.

In these runs, reported below in Table 13, 10 grams of "Elvanol 70–05" polyvinyl alcohol was placed in a 250 milliliter stainless steel reactor together with 1.0 milliliter of a catalyst, 100 milliliters of a solvent and 100 milliliters of ethylenimine. The reaction mixture was heated for 15 hours at 100° C., then cooled and thoroughly stirred, and then heated 8 hours at 100° C. The reaction was then cooled again, an additional 1.0 milliliter of catalyst was added and the reactor contents stirred. Finally the reaction mixture was heated for 24 hours at 100° C. The results of these runs are set forth below in Table 13.

Table 13
POLYVINYL ALCOHOL-ETHYLENIMINE REACTION WITH AGITATION IN BOMB REACTORS

| Run No. | Catalyst | Solvent | Percent Nitrogen in Product |
|---|---|---|---|
| 1 | Isobutyl chloride | Toluene | 26.8 |
| 2 | do | o-Dichlorobenzene | 20.9 |
| 3 | Ethylene chlorohydrin | Toluene | 25.8 |
| 4 | do | o-Dichlorobenzene | 15.7 |
| 5[1] | Ethylene dichloride | Toluene | 26.8 |

[1] In this run, the reactants were simply heated at 100° C. for 48 hours with no agitation.

These runs show that ethylene dichloride and toluene are the best catalyst and solvent, respectively, for the aminoethylation of polyvinyl alcohol, and these are particularly preferred for use in this aspect of our invention.

EXAMPLE XII

A group of runs was made wherein polyvinyl alcohol, "Elvanol 70-05," was reacted with ethylenimine at atmospheric pressure.

These runs were carried out by stirring and heating the reactants in a round-bottom flask equipped with a condenser and a soda-lime drying tube.

In Runs 2 and 3 reported below in Table 14, 10.0 grams of "Elvanol 70-05" polyvinyl alcohol was reacted with 100 milliliters of ethylenimine in the presence of 200 milliliters of toluene as a solvent and the indicated catalyst. In run No. 1, the amounts of reactants were 2.0 grams of "Elvanol 70-05" polyvinyl alcohol, 20 milliliters of ethylenimine and 40 milliliters of toluene.

Table 14
POLYVINYL ALCOHOL-ETHYLENIMINE REACTION AT ATMOSPHERIC PRESSURE

| Run No. | Catalyst | Amount of Catalyst, ml. | Reaction Time, hrs. | Percent Nitrogen in Product |
|---|---|---|---|---|
| 1 | Benzyl chloride | 0.2 | 40 | 27.1 |
| 2 | do | 1.0 | 44 | 27.4 |
| 3 | Ethylene chlorohydrin | 0.6 | 48 | 27.8 |

It will be apparent from the foregoing description that the objectives of this invention have been attained. We have invented a new and improved process for reacting cellulose or polyvinyl alcohol with an ethylenimine which permits the production of aminoethylated products having over 20% nitrogen, and usually from 26-30% nitrogen, in a single pass reaction. Our process is featured by the use of lower temperatures than were deemed necessary by the prior art and by the use of a solvent or diluent, and we believe we are the first to discover a catalytic process for graft polymerizing an ethylenimine onto cellulose or polyvinyl alcohol.

We claim:
1. A catalytic process for aminoethylating cellulose and polyvinyl alcohol, which comprises, heating in a substantially water-free, liquid phase system to a temperature of about 80–140° C. a member selected from the group consisting of cellulose and polyvinyl alcohol with an aminoethylating reactant selected from the group consisting of ethylenimine, 2 - methylethylenimine, 2,2-dimethylethylenimine, trimethylethylenimine, 2 - phenylethylenimine, 2 - (p-tolyl)ethylenimine, 2-biphenylethylenimine, 2 - (p-aminophenyl)ethylenimine, 2-(2,4-dinitrophenyl)ethylenimine and the methyl ester of p-(carboxyphenyl)-ethylenimine, in the presence of a catalyst selected from the group consisting of alkyl and alkenyl halides having up to and including 8 carbon atoms per molecule, cyclohexyl halides, benzyl halides, tetramethyl- and tetraethylamine halides, ethylene chlorohydrin, trimethylamine, hydrohalide, dimethylaniline hydrohalide, aniline hydrochloride, hydrochloric acid, sulfuric acid, ammonium halides, aluminum chloride, p-toluene sulfonic acid and naphthalene sulfonic acid, said heating step being carried out in the presence of a nonpolar and nonreactive solvent for said aminoethylating reactant selected from the group consisting of heptane, octane, nonane, decane, benzene, toluene, dioctylphthalate, monochlorobenzene and o-dichlorobenzene.

2. A method according to claim 1 wherein polyvinyl alcohol and ethylenimine are employed.

3. A method according to claim 1 wherein cellulose and ethylenimine are employed.

4. A method according to claim 3 wherein said catalyst is ethylene dichloride and said solvent is toluene.

5. A method according to claim 3 wherein said catalyst is benzyl chloride and said solvent is toluene.

6. A method according to claim 3 wherein said catalyst is isobutyl chloride and said solvent is toluene.

7. A method according to claim 3 wherein said catalyst is ethylene chlorohydrin and said solvent is toluene.

8. A method according to claim 3 wherein said catalyst is hydrochloric acid and said solvent is toluene.

References Cited in the file of this patent
UNITED STATES PATENTS

| | | |
|---|---|---|
| 1,971,662 | Schmidt et al. | Aug. 28, 1934 |
| 2,097,120 | Fink et al. | Oct. 26, 1937 |
| 2,261,294 | Schlack | Nov. 4, 1941 |
| 2,261,295 | Schlack | Nov. 4, 1941 |
| 2,518,676 | Gardner | Aug. 15, 1950 |
| 2,656,241 | Drake et al. | Oct. 20, 1953 |

OTHER REFERENCES

Mellan: "Industrial Solvents," page 14 only needed (New York: Reinhold Pub. Corp., 1950).

Marsden: "Solvents Manual," pp. 45, 153 and 234 needed (New York: Elsevier Press, 1954).